3,453,460
LINEAR INDUCTION MOTORS
Kenneth James Butler, Ormskirk, and Robin Arnold Merryweather, Rainford, England, assignors to Pilkington Brothers Limited, Liverpool, Lancashire, England, a corporation of Great Britain
Filed June 20, 1966, Ser. No. 558,890
Claims priority, application Great Britain, June 22, 1965, 26,412/65
Int. Cl. G21d 7/02; H02k 45/00
U.S. Cl. 310—11               4 Claims

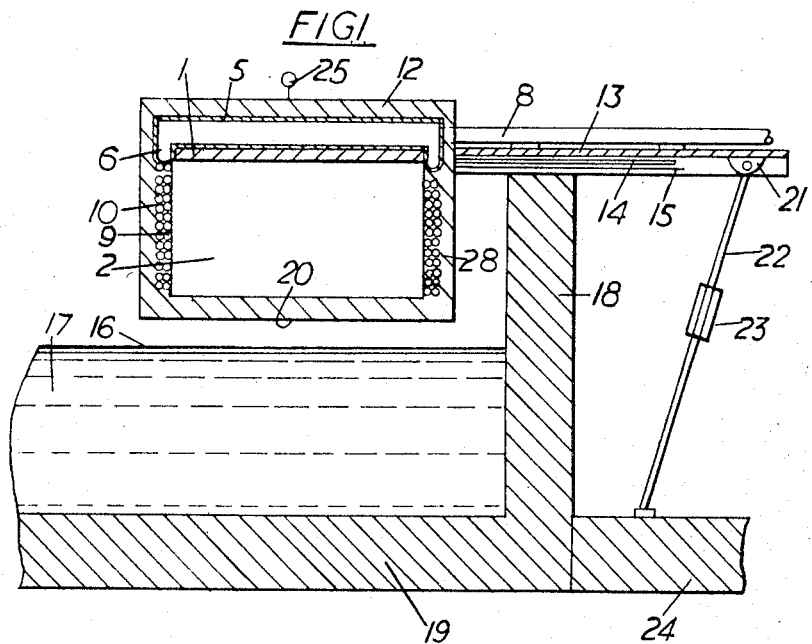

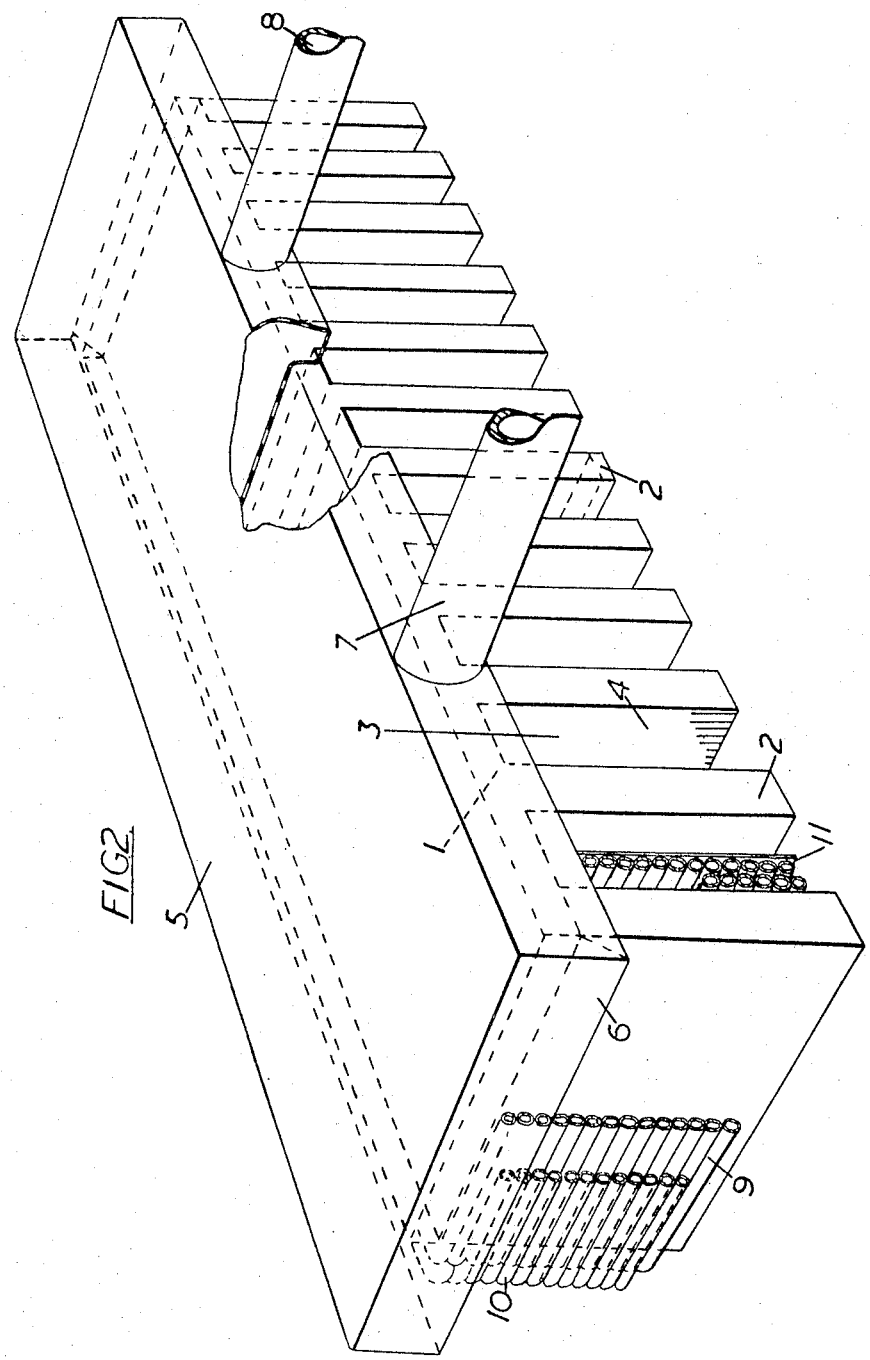

ABSTRACT OF THE DISCLOSURE

A linear induction motor for use under high temperature conditions has tubular cooling windings and a cooling box fixed to the laminated stator of the motor, the whole being protected by a cast envelope of refractory material.

---

This invention relates to linear induction motors and more especially to linear induction motors for use in conjunction with molten electrically-conductive material in the manufacture of flat glass.

It is a main object of the present invention to provide a new linear induction motor which can be subjected to the high temperature conditions appertaining in glass manufacturing processes.

According to the invention there is provided a linear induction motor for controlling by electromagnetic induction the movement of molten electrically conductive material during the manufacture of flat glass, comprising a laminated stator having a plurality of parallel limbs, windings on the stator limbs, and a cooling box fixed to the stator and having inlet and exhaust pipes, the whole being cast into a block of refractory material.

By enclosing the whole of the motor assembly in refractory material the stator is protected from the heat, for example from the heat of a molten metal bath on which the glass is supported, and of the glass supported on the surface of the molten metal bath, as well as the heat of the atmosphere over the bath. The cooling box fixed to the stator assures the cooling of the stator since the box is in good thermal contact with the stator.

Preferably the stator has a flat back from one face of which the parallel limbs project, and the cooling box is fixed to and extends over the other face of the back of the stator.

In order to intensify the cooling of the stator the windings of the motor are preferably of electrically conductive tubing, for example copper tubing, and are arranged for connection to a source of cooling fluid and to a three-phase alternating current supply.

It is preferred to use water as the cooling fluid supplied both to the cooling box and to the windings, although in some circumstances, for example where the ambient temperature is relatively low, a flow of cooling gas may be maintained through the cooling box and the tubular windings. The top and sides of the stator are thus almost completely enclosed by cooling surfaces and the only surfaces of the stator which are not directly cooled are the bottom surfaces of the limbs of the stator which are usually mounted parallel to the surface of the molten material whose movement is to be controlled. There is a thickness of refractory material between the bottom of these limbs, and the ambient heat and the thermal conductivity of the refractory is so much less than that of the material of the stator laminations, which are usually steel laminations, that even the bottom surfaces of the stator limbs are maintained effectively cooled by the combination of the cooling box and cooled tubular windings.

Any suitable castable refractory material may be employed for enveloping the motor assembly.

The ends of the windings and the inlet and exhaust pipes of the cooling box project from the refractory block and connections to the pipes and the windings are preferably carried by means for supporting the motor relative to the surface of a bath of molten metal.

The invention also comprehends apparatus for use in the manufacture of flat glass during which glass is in contact with a molten metal surface, characterized by at least one linear motor as described above mounted relative to the molten metal surface, and a three-phase alternating current supply and a source of cooling fluid connected to the motor.

In order that the invention may be more clearly understood, an embodiment thereof will now be described, by way of example, with reference to the accompanying drawings in which:

FIG. 1 is a section through a linear induction motor according to the invention, showing the motor located relative to the surface of a bath of molten metal, for example a bath of molten metal contained in a tank structure as described and claimed in, and FIG. 2 is a perspective view of the linear motor showing its component part.

The construction of a linear induction motor according to the invention is illustrated in FIGS. 1 and 2. The linear induction motor including in the figures a two-pole three-phase motor including a laminated stator which is made up of closely packed steel laminations. The stator has a flat back 1 with a plurality of parallel limbs 2 projecting from one face of the back 1 so that there are parallel slots 3 in the stator between the adjacent limbs.

The laminations from which the stator is built up are indicated at 4 in FIG. 2.

The other face of the back 1 of the stator is flat and a water box 5 is fixed to and extends over the whole of that face of the stator. The water box 5 is of rectangular form having a downwardly depending peripheral hollow flange 6 which fits over the sides of the back 1 of the stator. The flange 6 extends over the whole depth of the back 1 so that there is the maximum possible extraction of heat from the flat back 1 of the stator. Water is supplied to the water box 5 through a large diameter inlet pipe 7 and is exhausted through an exhaust pipe 8 of the same diameter. This enables a large circulation of cooling water to be maintained through the water box to assist in keeping the stator as cool as possible so that the temperature of the stator never approaches the Curie point of the steel from which the laminations 4 are made.

Each limb 2 of the stator is wrapped with insulating tape, not shown, and the windings of the stator are of copper tubing which are adapted for connection to a source of cooling water and to a three-phase alternating current supply. The disposition of the windings on one limb of the stator is shown in FIG. 2 there being an inner row of coils 9 of copper tubing which are individually insulated by a wrapping of asbestos tape, not shown, and an outer row of coils 10 also of identical copper tubing and also individually insulated by asbestos tape.

A thin mica plate 11 is located centrally in each slot of the stator between adjacent limbs in order to separate the windings of one limb from the similar windings of the adjacent limb.

The windings of copper tubing 9 and 10 of the stator fill the slots 3 in the stator so that the whole of the stator, apart from the bottom surfaces of the free ends of the limbs 2, is effectively cooled. The temperature of the stator is thus maintained well below the ambient temperature, and in order to provide additional thermal protection for the motor the whole motor assembly is cast into a block of refractory material 12 as shown in FIG. 1. The inlet and exhaust pipes 7 and 8 project through the block of refractory material and are carried on the upper surface of a support beam 13 one end of which is fixed into the refractory block 12. The beam has an inverted U-channel section. Supply pipes, indicated at 14, for supplying cooling water to the windings 9 and 10, and electrical connections, indicated at 15, to the windings are carried in the channel beam 13. The connections 15 are connected to a three-phase alternating current supply in well-known manner.

FIG. 1 illustrates the way in which a linear induction motor according to the invention can be mounted just above the surface 16 of a bath of molten metal 17 which is contained in a tank structure comprising side walls 18 and an internal floor 19. Such a tank structure for use in the manufacture of flat glass in ribbon form is described and claimed in the appended claims.

In order to control the movement of the molten metal of the bath, for example molten tin or a molten tin alloy in which tin predominates, the motor is mounted so that the lower face 20 of the refractory block 12 lies just above the surface 16 of the molten metal. The beam 13 rests on the top of the side wall 18 of the tank structure and carries on its undersurface, near its outer end, lugs 21 which are connected by a tie rod 22, including a turnbuckle 23, to an extension 24 of the floor 19 of the tank structure. By adjusting the turnbuckle 23 the spacing between the lower refractory face 20 of the motor and the surface 16 of the molten metal can be adjusted.

Additionally eyelet bolts 25 may be embedded in the top of the cast block of refractory material 12 so that the weight of the motor can be carried by a suspension from a roof structure supported over the tank structure.

The thickness of the refractory material between the bottom faces of the limbs of the stator and the lower face 20 of the refractory block is, for example ½ inch. Despite the fact that the ambient temperature may be as high as 1200° C. in the headspace over the bath the stator is maintained effectively cooled by the combination of the water box and the water-cooled windings on the stator.

If it is more convenient the inlet and exhaust water pipes as well as the electrical connections may extend through the top of the refractory block 12 into the roof structure over the bath of molten metal.

Although in the drawings a motor according to the invention is shown mounted relative to the surface of the molten metal bath, the motor may be mounted above the glass on the bath so as to induce movement of the molten metal underneath the glass.

The invention thus provides a linear induction motor capable of accurate propulsion of molten electrically conductive material, which is possible because the cooled linear motor construction according to the present invention enables the motor to be used in locations where the ambient temperature approaches or is greater than the Curie Point of the magnetic material forming the stator. Because of the intensive water-cooling of the stator there is no harmful effect on the stator material and the motor operates satisfactorily in high temperature conditions such as temperature in the range 700° C. to 1200° C.

We claim:

1. A linear induction motor for controlling by electromagnetic induction the movement of molten electrically conductive material during the manufacture of flat glass comprising a laminated stator having a flat back and a plurality of parallel limbs projecting from one face of the flat stator back, windings on said parallel stator limbs, a cooling box fixed to and extending over the other face of the flat stator back, inlet and exhaust pipes connected to the cooling box for supplying and exhausting cooling fluid, and a protective envelope of cast refractory material completely encapsulating the motor.

2. A linear induction motor for controlling by electromagnetic induction the movement of molten electrically conductive material during the manufacture of flat glass, comprising a laminated stator having a plurality of parallel limbs, windings on the stator limbs of electrically conductive tubing adapted for connection to a supply source of cooling fluid and to a three-phase alternating supply, a cooling box fixed to the stator, and inlet and exhaust pipes connected to the cooling box for supplying and exhausting cooling fluid, and a protective envelope of cast refractory material completely encapsulating the motor.

3. A motor according to claim 2, wherein the ends of the tubular windings and the inlet and exhaust pipes of the cooling box project through the refractory protective envelope carrying means for supporting the motor relative to the surface of a bath of molten metal is fixed into the refractory protective envelope, and connections to the inlet and exhaust pipes and to the tubular windings are also carried by said carrying means.

4. In apparatus for use in the manufacture of flat glass, comprising an elongated tank structure containing a bath of molten metal supporting the glass in ribbon form, a linear induction motor mounted on the tank strucure so as to be positioned just above the surface of the molten metal bath, said motor comprising a laminated stator having a flat back from one face of which a plurality of parallel limbs project, windings on the stator limbs connected with a three-phase alternating current supply, a cooling box fixed to and extending over the other face of the back of the stator, a protective envelope of cast refractory material completely encapsulating the motor, and inlet and exhaust pipes connected to the cooling box and projecting from said encapsulating envelope, said inlet pipe being connected also with a supply source of cooling fluid.

References Cited

UNITED STATES PATENTS

| | | | |
|---|---|---|---|
| 2,985,106 | 5/1961 | Rhudy | 310—11 XR |
| 2,770,785 | 11/1956 | Haagens et al. | 336—55 XR |
| 3,163,838 | 12/1964 | Antalis et al | 336—55 |
| 2,383,383 | 8/1945 | Harding | 310—16 XR |
| 2,764,095 | 9/1956 | Baker | 310—114 XR |
| 2,865,291 | 12/1958 | Watt | 310—11 XR |
| 3,144,627 | 8/1964 | Dunnabeck et al. | 336—55 |
| 754,681 | 3/1904 | Muller | 310—16 |
| 3,333,123 | 7/1967 | Baumann | 310—11 |
| 2,769,962 | 11/1956 | Melville | 336—55 XR |
| 3,173,248 | 3/1965 | Curtis et al. | |

FOREIGN PATENTS

| | | |
|---|---|---|
| 1,161,994 | 1/1964 | Germany. |
| 911,257 | 11/1962 | Great Britain. |

MILTON O. HIRSHFIELD, *Primary Examiner.*

B. A. REYNOLDS, *Assistant Examiner.*

U.S. Cl. X.R.

103—1; 310—13